US007116702B2

(12) United States Patent
Sim (10) Patent No.: US 7,116,702 B2
(45) Date of Patent: Oct. 3, 2006

(54) SIGNAL PROCESSING METHOD AND APPARATUS IN CDMA RADIO COMMUNICATION SYSTEM

(75) Inventor: Dong Hi Sim, Seoul (KR)

(73) Assignee: LG Electronics Inc., Seoul (KR)

( * ) Notice: Subject to any disclaimer, the term of this patent is extended or adjusted under 35 U.S.C. 154(b) by 724 days.

(21) Appl. No.: 10/162,075

(22) Filed: Jun. 5, 2002

(65) Prior Publication Data

US 2002/0196767 A1    Dec. 26, 2002

(30) Foreign Application Priority Data

Jun. 7, 2001    (KR)    ............................ P2001-31597

(51) Int. Cl.
*H04K 1/00*    (2006.01)
(52) U.S. Cl. ...................... 375/148; 375/347; 370/335; 370/342
(58) Field of Classification Search ................ 375/142, 375/140, 347, 267, 144, 260, 299, 147, 148, 375/149; 370/335, 342, 208, 210; 455/562.1
See application file for complete search history.

(56) References Cited

U.S. PATENT DOCUMENTS

| 6,069,912 | A  | * | 5/2000  | Sawahashi et al. | ......... | 375/142  |
| 6,208,632 | B1 | * | 3/2001  | Kowalski et al.  | ........... | 370/335  |
| 6,415,163 | B1 | * | 7/2002  | Keskitalo et al. | ........ | 455/562.1 |
| 6,473,467 | B1 | * | 10/2002 | Wallace et al.   | ............. | 375/267  |
| 6,771,219 | B1 | * | 8/2004  | Sim              | ........................... | 342/382  |
| 6,831,943 | B1 | * | 12/2004 | Dabak et al.     | ................ | 375/147  |
| 2003/0031234 | A1 | * | 2/2003 | Smee et al.      | .................. | 375/147  |
| 2003/0035468 | A1 | * | 2/2003 | Corbaton et al.  | ........... | 375/148  |

FOREIGN PATENT DOCUMENTS

WO     01/13530 A1    2/2001

OTHER PUBLICATIONS

Smart antenna arrays for CDMA systems Thompson, J.S. et al; Personal Communications, IEEE [see also IEEE Wireless Communications] vol. 3, Issue 5, Oct. 1996 pp. 16-25.*
Ikeda et al. "Experimental Evaluation of Coherent Rake Receiver for Broadband DS-CDMA Mobile Radio".
Etsi-Ran Universal Mobile Telecommunications System (UMTS); Multiplexing and Channel Coding (FDD).

* cited by examiner

*Primary Examiner*—Temesghen Ghebretinsae
(74) *Attorney, Agent, or Firm*—Fleshner & Kim LLP

(57) ABSTRACT

A method for processing signals in a multi-antenna CDMA radio communication system extracts control signals by despreading signals transmitted to a specific user through the antennas using a spreading factor, estimating weight values of respective ones of the antennas using at least one signal separated from the extracted control signals, and extracting data signals by despreading remaining signals, except for the control signals, using control information provided from control channels. The method then multiplies the extracted data signals by the weight values of the respective antennas, and combines and outputs the data signals multiplied by the weight values.

12 Claims, 7 Drawing Sheets

SIGNAL PROCESSING METHOD AND APPARATUS IN CDMA RADIO COMMUNICATION SYSTEM

BACKGROUND OF THE INVENTION

1. Field of the Invention

The present invention relates to a method and apparatus for processing signals in a code division multiple access (CDMA) radio communication system.

2. Background of the Related Art

In order to implement an adaptive array antenna for performing spatial and temporal processes, a CDMA system typically uses a frequency down converter for converting a very high frequency signal into a baseband signal, an analog-to-digital (A/D) converter for converting an analog signal into a digital signal, a beamformer for performing the spatial process, a rake receiver for performing despreading and the temporal process, and a digital demodulator for demodulating a digitally modulated signal.

Figure 1:
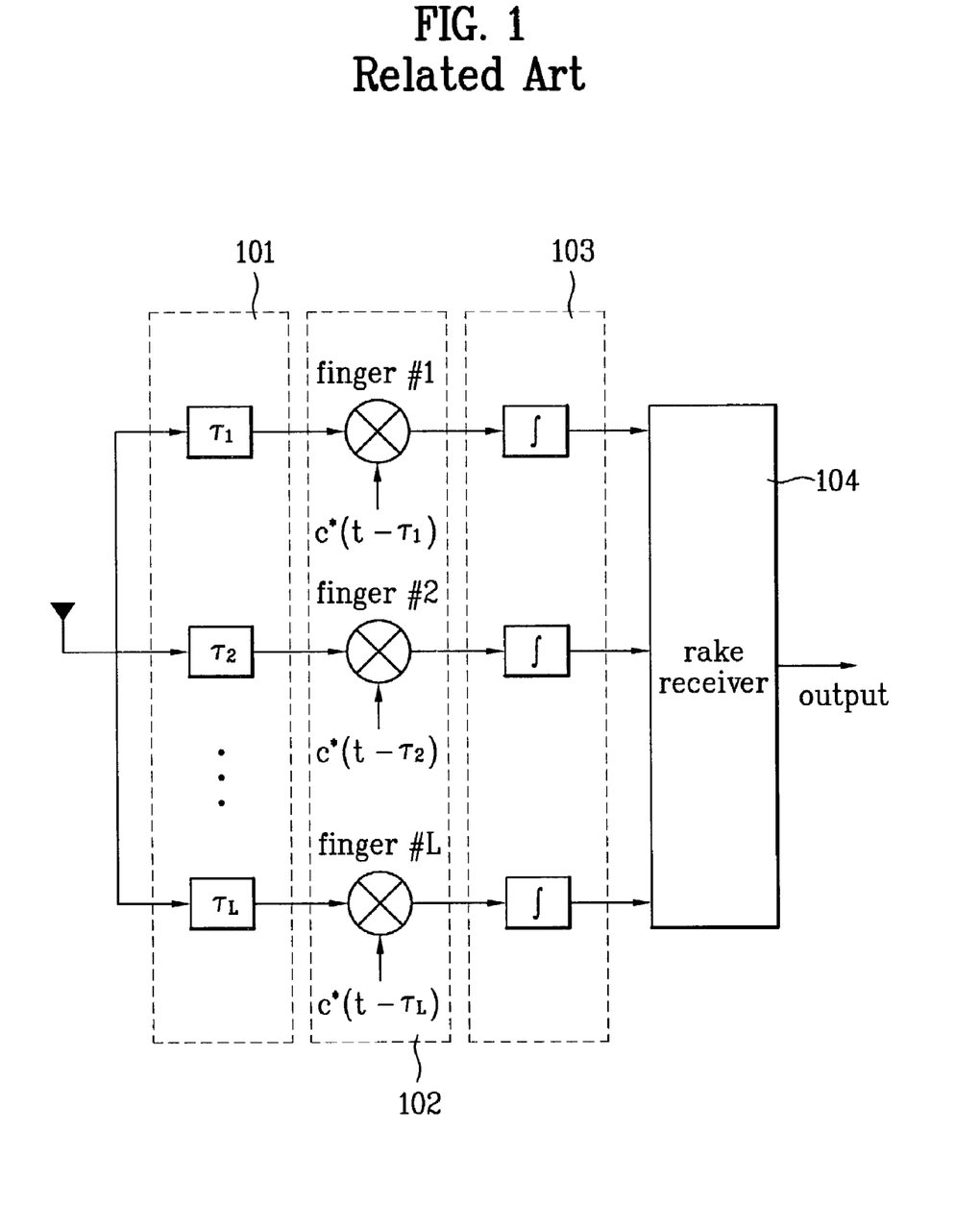
FIG. 1 is a view illustrating a conventional rake receiver for a temporal process.

FIG. 1 shows the construction of a conventional rake receiver of a CDMA system for performing the temporal process only. In the frequency selective fading environment, the degree of delay of multiple paths becomes larger than a symbol period. In the CDMA system, the signal process is performed in the unit of a chip, and based on the assumption that one symbol corresponds to one chip, an intersymbol interference (ISI) that is larger than one chip period can be discriminated through the rake receiver.

As shown in FIG. 1, in case that multiple paths exist, the L multiple paths having time differences can be discriminated by using L fingers. Each finger includes a time delay 101, a correlator 102, and an integrator 103. More specifically, in order to discriminate the respective paths, the rake receiver is composed of several correlators that match the respective time delays of the multiple paths, and their outputs are summed together by the rake receiver to maximize the signal_to_noise ratio (SNR). Generally, components of the multiple paths have different time delays and different incident angles.

A receiver using an existing single antenna can analyze signals on a time base only, and thus only the temporal process is performed using the rake receiver. However, in a smart base transceiver system which has various antennas installed therein, signals on a space base can also be analyzed.

Figure 2:
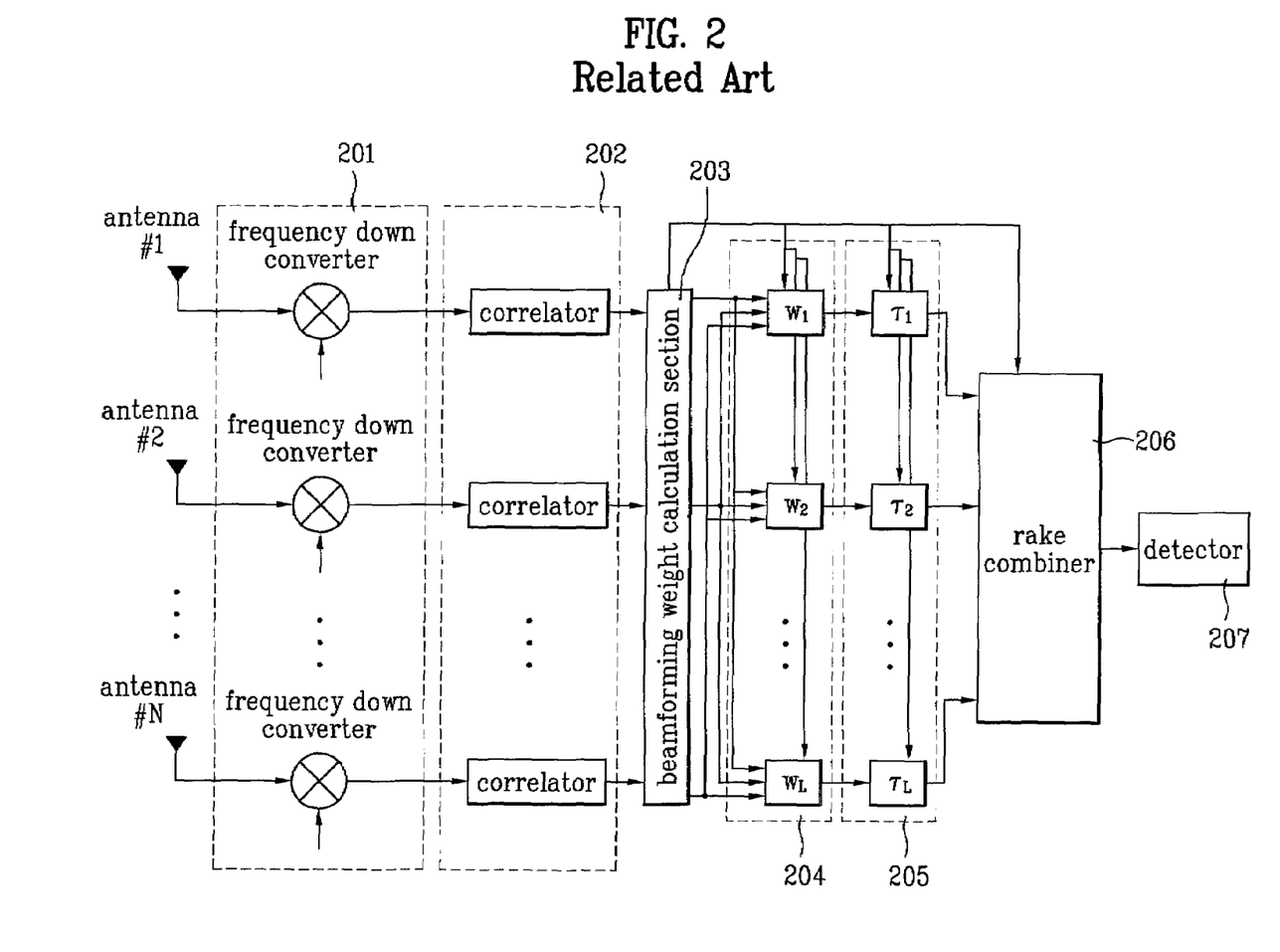
FIG. 2 is a view illustrating a conventional rake receiver for spatial and temporal processes.

FIG. 2 shows a conventional smart base transceiver system in the form of a two-dimensional rake receiver. In this receiver, signals of respective paths received through the antennas are converted into down frequencies by frequency down converters 201 (step 201), and their correlations are obtained through correlators 202.

In order to use the respective multiple paths having different incident angles, the two-dimensional rake receiver allocates a beamformer 204 to each path, performs the spatial process using weight vectors calculated by a beamforming weight calculation section 203, and combines the processed signals through a rake combiner 206. Then, the two-dimensional rake receiver processes the combined signal using the existing rake receiver, and then combines the signals of the respective paths whose spatial and temporal processes are completed.

In the conventional CDMA system, it is therefore clear that a finger only takes charge of the temporal process in a manner that it is allocated with a path having a different time delay using a signal received through a single antenna. On the other hand, the two-dimensional rake receiver takes charge of the spatial process in such a manner that a finger generates weight vectors based on signals received through a plurality of antennas, combines the respective antenna signals, and then takes charge of the temporal process. Of course, the two-dimensional rake receiver is allocated with signals having the different time delays through the respective fingers, and then combines all the signals whose processes have been completed in the same manner as the conventional system.

However, there is a great difference between performing the temporal process only and simultaneously performing the temporal process and the spatial process.

A beamforming algorithm (i.e., performed by the beamforming weight vector calculation section 203) in the two-dimensional rake receiver refers to obtaining an eigenvector that corresponds to the maximum eigenvalue of an autocorrelation matrix using the autocorrelation matrix composed of signal vectors. At this time, in order to obtain weight vectors to be applied to the beamformer for an IS-95 CDMA system, the conventional receiver performs the beamforming algorithm using both a high-speed signal before being despread to a predefined code and a low-speed signal after being despread to the predefined code.

In addition, in order to apply the adaptive algorithm, the conventional receiver calculates the autocorrelation matrix of the signal obtained by sampling the signal before being despread and the autocorrelation matrix of the signal obtained by sampling the signal after being despread, and then calculates the weight vectors for the spatial process using the respective matrices.

As described above, application of the two-dimensional rake receiver used in the CDMA system to a wideband code division multiple access (WCDMA) system is now under consideration. However, the principle of the rake receiver cannot be applied to the WCDMA system as it is, but its signal processing method should be changed to match the WCDMA system even though the rake receiver can be used in the WCDMA system.

The above references are incorporated by reference herein where appropriate for appropriate teachings of additional or alternative details, features and/or technical background.

SUMMARY OF THE INVENTION

One object of the present invention is to provide a method and apparatus for processing signals in a CDMA system that substantially obviates one or more problems due to limitations and disadvantages of the related art.

Another object of the present invention is to provide a method and apparatus for processing signals in a CDMA radio communication system using an adaptive antenna array that suitably enables spatial and temporal processes to be performed.

These and other objects and advantages of the present invention are achieved by providing a method for processing signals in a CDMA radio communication system which receives signals through a plurality of antennas. In accordance with one embodiment, the method includes extracting control signals by despreading the signals transmitted to a specified user through the plurality of antennas using a predetermined spreading factor, estimating weight values of the respective antennas using at least one signal separated from the extracted control signals, extracting data signals by despreading remaining signals except for the control signals among the signals transmitted to the specified user using the control information provided from control channels, multiplying the extracted data signals by the weight values of the respective antennas, and combining and outputting the data signals multiplied by the weight values.

The data signal extracting step preferably comprises the steps of temporarily storing the remaining signals except for the control signals among the signals transmitted to the specified user, judging if a time period of the estimated weight values is a period of one frame, and if it is judged that the time period is the period of one frame, extracting the data signals by applying the estimated weight values to the stored remaining signals. The estimated weight values are preferably updated for each weight updating period, and accumulated for the period of one frame.

In accordance with one aspect of the invention, the weight value estimating step estimates the weight value using the ratio of the signal before despreading that is separated from the extracted control signals to the signal after despreading.

In accordance with another aspect of the invention, the weight value estimating step estimates the weight value using the signal after despreading of the extracted control signals.

In accordance with another aspect of the invention, the weight value estimating step comprises the steps of calculating an interference signal vector by subtracting the signal after despreading of the control signals from the signal before despreading of the control signals, and estimating the weight value using the ratio of a desired signal extracted from the signal after despreading to the interference signal vector.

The signal processing method may further comprise applying the estimated weight values to the control channels, obtaining the control information from the control channels to which the weight values are applied.

In accordance with another embodiment of the present invention, a method for processing signals in a CDMA radio communication system having a plurality of antennas includes separating signals of the same signal source by despreading the signals received through control channels having a constant spreading ratio among the signals received through the plurality of antennas, estimating weight values of the respective antennas for the signals of the same signal source by comparing the signals before despreading of the signals received through the control channels with the signals of the same signal source, despreading the signals of the data channels of the same signal source using control information received through the control channels, multiplying the despread signals of the data channels by the weight values of the respective antennas, respectively, and combining and outputting the signals multiplied by the weight values.

In accordance with another embodiment of the present invention, a method for processing signals in a CDMA radio communication system having a plurality of antennas includes extracting control signals by despreading the signals transmitted to a specified user through the plurality of antennas using a predetermined spreading factor, estimating weight values of the respective antennas using at least one signal separated from the extracted control signals in the unit of a symbol or slot, applying the estimated weight values to the control channels in the corresponding unit and accumulating the weight values for the period of one frame, obtaining a control information from the control channel to which the estimated weight values are applied for the period of one frame, extracting data signals by despreading remaining signals except for the control signals among the signals transmitted to the specified user using the control information, multiplying the extracted data signals by the accumulated weight values of the respective antennas, and combining and outputting the data signals multiplied by the weight values.

In accordance with another embodiment of the present invention, a signal processing apparatus in a CDMA radio communication system having a plurality of antennas includes a first signal extraction section for extracting control signals by despreading the signals transmitted to a specified user through the plurality of antennas using a predetermined spreading factor, a weight value estimation section for estimating weight values of the respective antennas using at least one signal separated from the extracted control signals, a second signal extraction section for extracting data signals by despreading remaining signals except for the control signals among the signals transmitted to the specified user using the control information provided from control channels, a weight value applying section for multiplying the extracted data signals by the weight values of the respective antennas, and a combiner for combining and outputting the data signals multiplied by the weight values.

Preferably, the signal processing apparatus further comprises a buffer for temporarily storing the remaining signals except for the control signals among the signals transmitted to the specified user, and a discriminator for judging if a time period of the estimated weight values is a period of one frame wherein if it is judged that the time period is the period of one frame, the second signal extraction section extracts the data signals by applying the estimated weight values to the stored remaining signals. Preferably, the estimated weight values are updated for each weight updating period, and accumulated for the period of one frame.

According to one aspect of the invention, the weight value estimation section estimates the weight value using the ratio of the signal before despreading that is separated from the extracted control signals to the signal after despreading.

According to another aspect of the invention, the weight value estimation section estimates the weight value using the signal after despreading of the extracted control signals.

According to another aspect of the invention, the weight value estimation section calculates an interference signal vector by subtracting the signal after despreading of the control signals from the signal before despreading of the control signals, and estimates the weight value using the ratio of a desired signal extracted from the signal after despreading to the interference signal vector.

The signal processing apparatus may also use the first signal extraction section to apply the estimated weight values to the control channels and to provide the second signal extraction section with the control information from the control channels to which the weight values are applied.

It is to be understood that both the foregoing general description and the following detailed description of the present invention are exemplary and explanatory and are intended to provide further explanation of the invention as claimed.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF PREFERRED EMBODIMENTS

Figure 3:
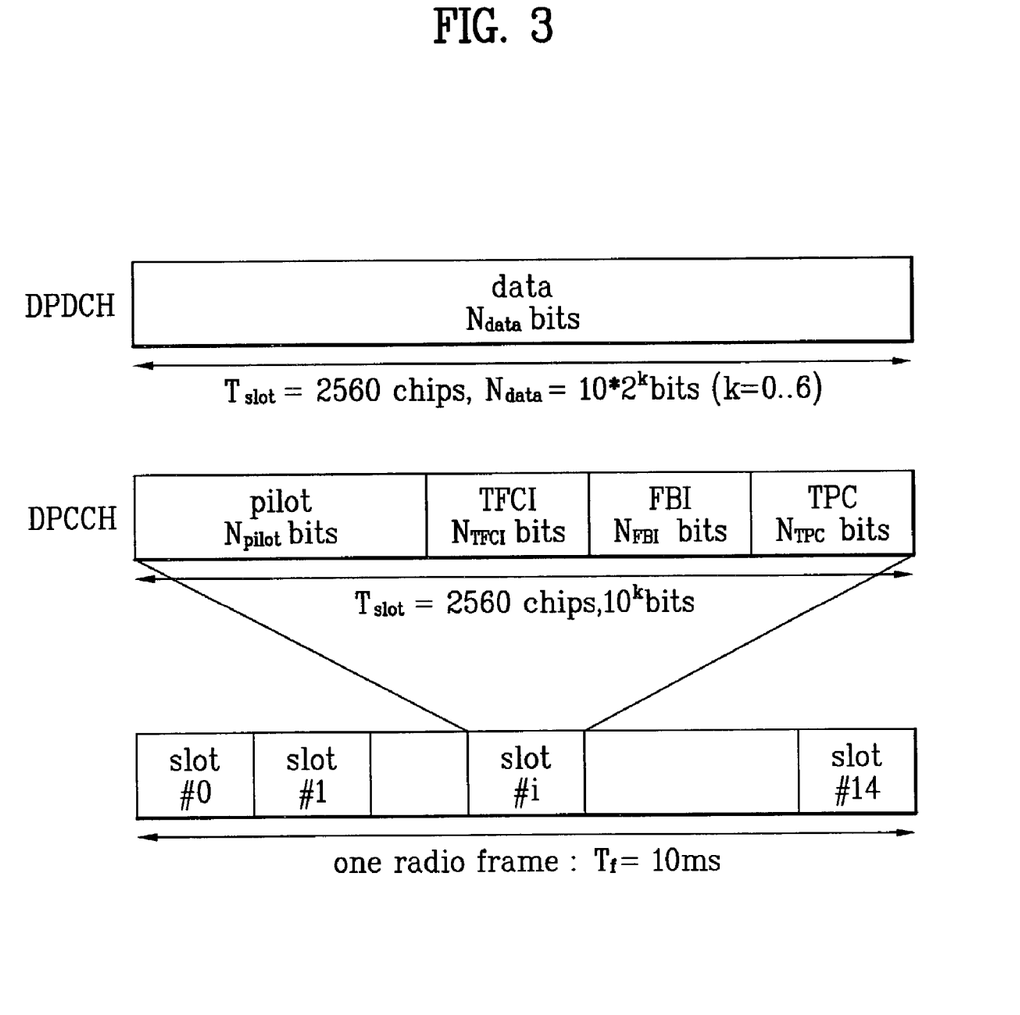
FIG. 3 is a view illustrating the structure of a DPDCH and a DPCCH used in accordance with the present invention.

Referring to FIG. 3, in a channel structure of a WCDMA system to which one embodiment of the present invention is applied, a dedicated physical channel (DPCH) that is a backward channel from a terminal to a base transceiver system with respect to slots of one radio frame (Tf=10 ms) is composed of a dedicated physical control channel (DPCCH) and a dedicated physical data channel (DPDCH).

The DPCCH is composed of pilot symbols for estimating channel information, a transport format combination indicator (TFCI) field including spreading factor (SF) information of the backward channel, etc., a feedback information FBI field that is a feedback signal for a transmit diversity and so on in the terminal, and a transmit power control (TPC) field including power control information.

The DPDCH is a channel that includes actual data of a user.

Figure 4:
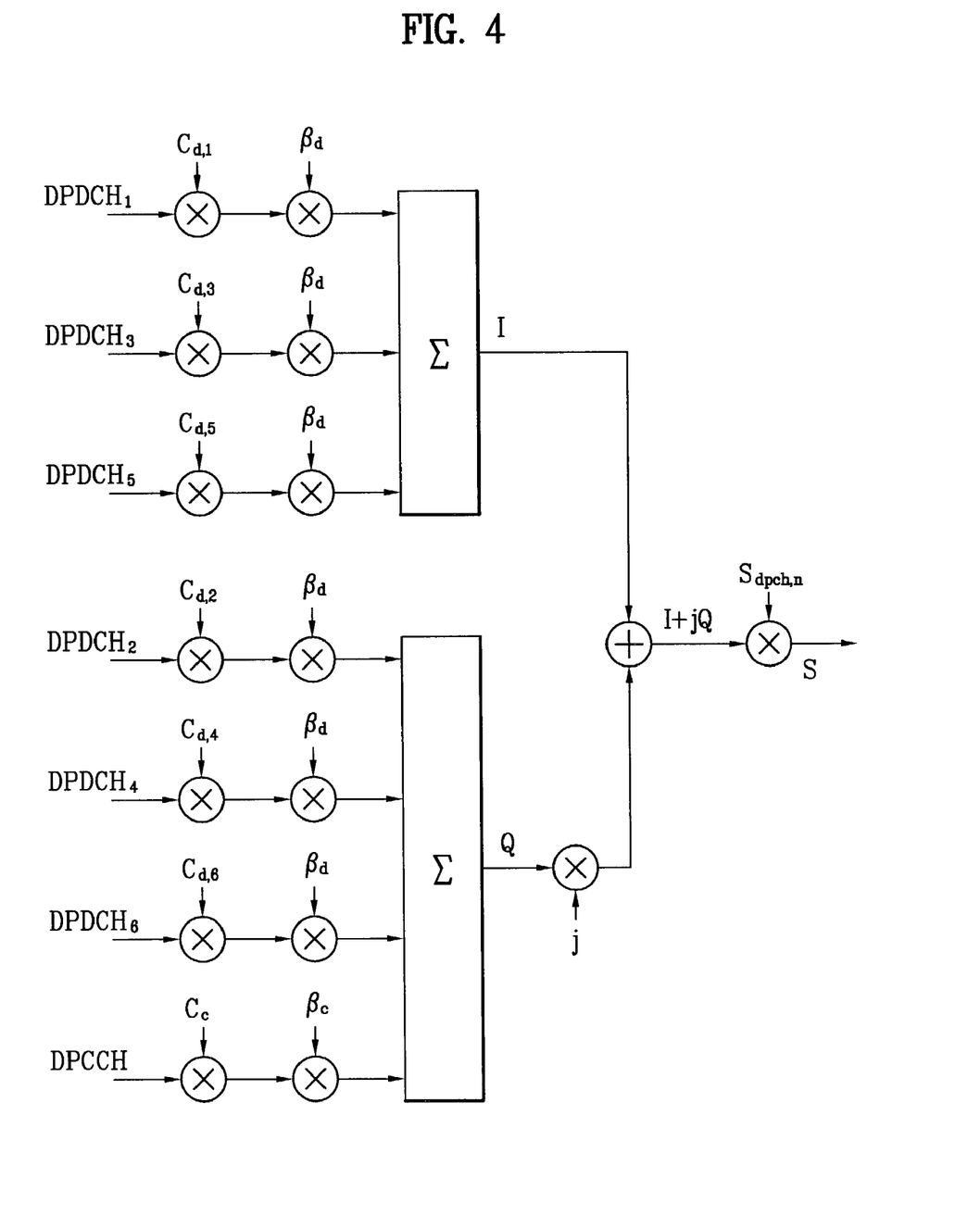
FIG. 4 is a view illustrating a signal process of the DPDCH and the DPCCH used in accordance with the present invention.

FIG. 4 is a diagram illustrating a signal process of the DPDCH and the DPCCH used in the present invention, and more particularly a despreading process of the backward channels the DPCCH and the DPDCH. In this figure, Cd and Cc denote channelization codes of the DPDCH and the DPCCH, and Sdpch denotes a scrambling code for the DPCH.

In spreading the DPDCH and the DPCCH, the corresponding channelization codes Cd and Cc, and channel gains bd and bc are applied to the respective data to be transmitted. Inphase (I) and quadrature (Q) signals are then summed by summing all the data, and an S signal is produced by applying again the scrambling code Sdpch,n to a result of summing. The DPCCH is included only in the Q signal.

The backward signal that is transmitted through the DPCH and received in the base transceiver system is called s(t), which is given by the following equation 1.

$$s(t)=[(b_i^d(t)+jb_q^d(t))C_d(t)\beta_d+jb_q^c(t)C_c(t)\beta_c]s_{dpch}(t) \quad (1)$$

At this time, $b_i^d(t)$, $b_q^d(t)$ represent I and Q data components of the DPDCH of a specified user, $b_q^c(t)$ represents the Q component of the DPCCH, and $\beta_d$, $\beta_c$ represent channel gains of the DPDCH and the DPCCH, respectively. $s_{dpch}(t)$ represents a scrambling code of the whole DPCH.

Figure 5:
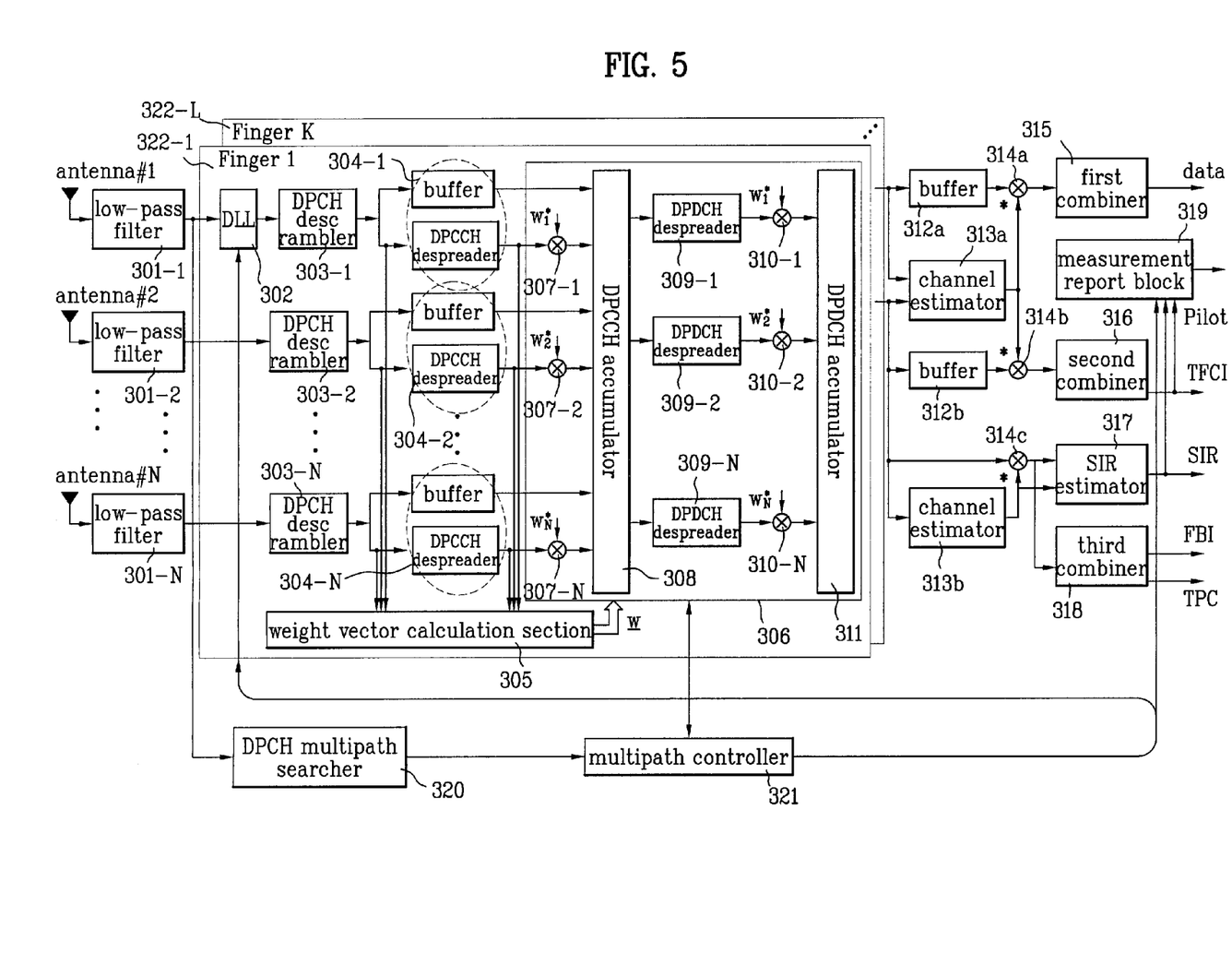
FIG. 5 is a diagram of a signal processing system according to first and second embodiments of the present invention.

FIG. 5 is a diagram of a signal processing system according to first and second embodiments of the present invention.

First Embodiment

Referring to FIG. 5, in implementing an adaptive array antenna system for spatial and temporal processes for a CDMA system according to the first embodiment of the present invention, there is provided a signal processing apparatus including frequency down converters (not illustrated) for converting a received very high frequency signal into a baseband signal, analog-to-digital (A/D) converters (not illustrated) for converting an analog signal of the baseband into a digital signal, low-pass filters 301-1 to 301-N for removing a noise of the received signal, fingers 322-1 to 322-L for performing the spatial and temporal processes, a DPCH multipath searcher 320, and a multipath controller 321.

The signal processing apparatus further includes buffers 312a and 312b, channel estimators 313a and 313b, combiners 315, 316, and 318, an SIR estimator 317, and a measurement report block 319 for performing their own corresponding functions using outputs of the multipath controller 321 and the fingers 322-1 to 322-L, respectively.

The fingers 322-1 to 322-L include a beamformer 306 for performing the spatial process with respect to L (L is an integer not less than 2) paths, signal processing sections 302, 303-1 to 303-N, and 304-1 to 304-N for the temporal process including despreading of the WCDMA system, and a weight vector calculation section 305 for beamforming.

Now, the spatial and temporal processes in the WCDMA system using an adaptive antenna array according to the present invention will be explained in order.

First, the low-pass filters 301-1 to 301-N remove noise from signals received through an array of N antennas, respectively.

The multipath searcher 320 separates the distributed multipath signals using the code characteristic according to the received time differences of the multipath signals, and then measures signal strengths of the respective paths. The multipath searcher also provides timing information of the separated multipath signals and a result of measurement of the signal strengths to the multipath controller 321.

The multipath controller 321 transfers the timing information of the signals of the respective paths and the code status to the fingers 322-1 to 322-L, and allocates the paths to the respective fingers in the order of the signal strength of the respective paths, so that the respective fingers can continue the signal process in synchronization with the designated code. Also, the multipath controller 321 provides the timing information to a delay lock loop (DLL) 302 so that the delay lock loop 302 adjusts the timing of a reference antenna, and provides the timing information and the path allocation information to a beamforming module 306 and the measurement report block 319.

Specifically, the beamforming module 306 shares the timing information of the DPCH multipath searcher 320 and the information on which path among the multiple paths is received with the respective fingers 322-1 to 322-L, so that it can recognize in advance the information on the beamforming execution time and so on.

The low-pass-filtered signals are descrambled through descramblers 303-1 to 303-N by a descrambling code of the DPCH according to the timing, and then despread through despreaders 304-1 to 304-N by a despreading code of the DPCCH channel.

The spreading factor (SF) of the DPDCH and the transport format combination indicator (TFCI) of the DPCCH can be recognized after completely receiving and decoding one frame of the DPCCH. Accordingly, the DPDCH should be stored in a memory such as a buffer until the TFCI information is obtained by despreading one frame of the DPCCH.

On the other hand, since the SF of the DPCCH is fixed to 256 and the channelization code (i.e., spreading code or despreading code) is known in advance, the DPCCH can be despread without the necessity of storing one frame of the DPCCH. Accordingly, the DPCCH despreaders and buffers 304-1 to 304-N store therein the DPDCH until the weight vectors are updated, and then despread the DPCCH using the SF (=256) and the known channelization code.

The weight vector calculation section 305 calculates the weight vectors for the beamforming using the signals before and after despreading the DPCCH.

The beamforming algorithm for calculating the weight vectors estimates autocorrelation matrices $$(\underline{R}_{xx}, \underline{R}_{yy})$$

of the respective signal vectors using a signal vector $\underline{x}$ before despreading of the DPCCH and a signal vector $\underline{y}$ after despreading of the DPCCH.

The maximum eigenvector corresponding to the maximum eigenvalue of a matrix expression composed of the two matrices is obtained, and then respective components of the eigenvector are estimated as the weight vectors to be applied to the DPCCH and the DPDCH, respectively.

This is given by the following equation.

$$\underline{R}_{yy} \underline{w} = \lambda \underline{R}_{xx} \underline{w} \qquad (2)$$

Of course, since the input signals into the respective fingers are different from one another, the different weight factors are obtained through the respective fingers 322-1 to 322-L. Thus, the same beamforming algorithm is used for the respective fingers, but they are independently performed in the respective fingers since the input signals are different from one another.

Though the same equation is used in case of using the beamforming algorithm according to the present invention, the modem structure for a smart antenna should be changed since the input signals for constructing the respective matrices are different from one another according to the system.

The beamforming process in the symbol level of the DPDCH using the weight vectors estimated using the signal vector before despreading of the DPCCH and the signal vector after despreading of the DPCCH will now be explained.

First, while the weight vector calculation section 305 obtains the weight vectors using the signal before despreading of the DPCCH signal and the signal after despreading of the DPCCH signal, the data of the DPDCH is continuously stored in the buffer until one frame of the DPCCH is completely despread.

The weight vectors (i.e., updated values of weight vectors for one frame) estimated by the weight vector calculation section 305 are applied to the DPCCH channel by first weight value applying sections 307-1 to 307-N. A DPCCH accumulator 308 accumulates the DPCCH to which the weight values are applied for a predetermined time.

DPDCH despreaders 309-1 to 309-N receive control information required for the despreading from the DPCCH accumulated for the predetermined time, and despread the DPDCH stored in the buffer. Second weight value applying sections 310-1 to 310-N apply the estimated weight vectors to the DPDCH. A DPDCH accumulator 311 accumulates the DPDCH to which the weight values are applied for a predetermined time.

The operation of the first weight value applying sections 307-1 to 307-N and the second weight value applying sections 309-1 to 309-N represents the process of performing the spatial process.

The spatial process is performed after the weight vectors are completely obtained using the DPCCH signal for one frame, and the weight vector values should also be stored according as the update of the weight vectors is performed in the unit of a symbol, a slot, or another unit (for example, in the unit of a frame).

If the DPCCH signal is completely received for one frame, the TFCI is decoded for the despreading of the DPDCH, and the DPDCH is actually despread using the decoded TFCI information. That is, the DPCCH signal is used for updating the weight vectors for the beamforming as it is continuously despread.

Basically, the DPDCH beamforming is performed in the unit of a frame through a dot-product of the updated values of the weight vectors obtained for one frame and stored and the stored values of the DPDCH data to match the updated period of the weight vector.

As described above, the DPCCH including the DPDCH despreading information is first received with a good quality through the beamforming, and then the DPDCH is beamformed and despread. This can provide better performance than the case that the weight vectors of the DPCCH and the DPDCH are separately obtained using the DPCCH and the DPDCH signals, respectively.

As described above, the beamforming is simultaneously and separately performed in the respective fingers, considering that the weight vectors of the respective fingers are different from one another due to the different incident angles of the respective paths.

Thereafter, channel estimators 313a and 313b detect the size and the phase of the signal offset through the respective paths of the fingers from the DPCCH and the DPDCH to which the weight values are applied. Distortion compensation applying sections 314a to 314c compensate for the signals of the DPCCH and the DPDCH to which the weight values are applied according to the detected size and phase.

The signals of the respective fingers whose phases and sizes are compensated for are summed by combiners 316 and 318 and an SIR estimator 317, and final values of TFCI, SIR, FBI, and TPC are outputted to the measurement report block 319 for the power control, SIR estimation, etc.

The DPDCH signals of the respective fingers whose phases and sizes are compensated for are summed through another combiner 315, and the final data is outputted.

Second Embodiment

In case that the weight vector calculation section 305 uses the beamforming algorithm, autocorrelation matrices of a signal vector $\underline{v}$ where only a desired signal component exists and a signal vector $\underline{u}$ where only an interference signal component exists are obtained by analyzing the desired signal component and the interference signal component of the DPCCH signal.

Since the desired signal component has already been despread by the code of the desired signal in the despread DPCCH signal, the desired signal component can be obtained by processing the despread signal by the corresponding code and summing the processed signal in a gain period. Also, the component of the interference signal source can be obtained by subtracting the estimated value of the desired signal component from the signal before the despreading.

If the autocorrelation matrices are obtained by estimating the desired signal component vector and the interference signal component vector, the autocorrelation matrix of the desired signal source and the autocorrelation matrix of the interference signal can be obtained, and then the weight vectors for the smart antenna system can be obtained using the obtained matrices.

$$\underline{R}_{vv}w = \lambda \underline{R}_{uu}w \qquad (3)$$

In this matrix expression, it can be assumed that $$\underline{R}_{vv}, \underline{R}_{uu}$$

correspond to $$\underline{R}_{yy}, \underline{R}_{xx}$$

of the equation 2. Since only the method of obtaining $$\underline{R}_{vv}, \underline{R}_{uu}$$

is different, the system illustrated in FIG. 5 can be used as it is except for the portion of estimating the two matrices.

Accordingly, except that the method of obtaining the autocorrelation matrix of the desired signal source and the autocorrelation matrix of the interference signal is changed, the signal processing method for the basic spatial and temporal processes is the same as that illustrated in FIG. 5.

Third Embodiment

Figure 6:
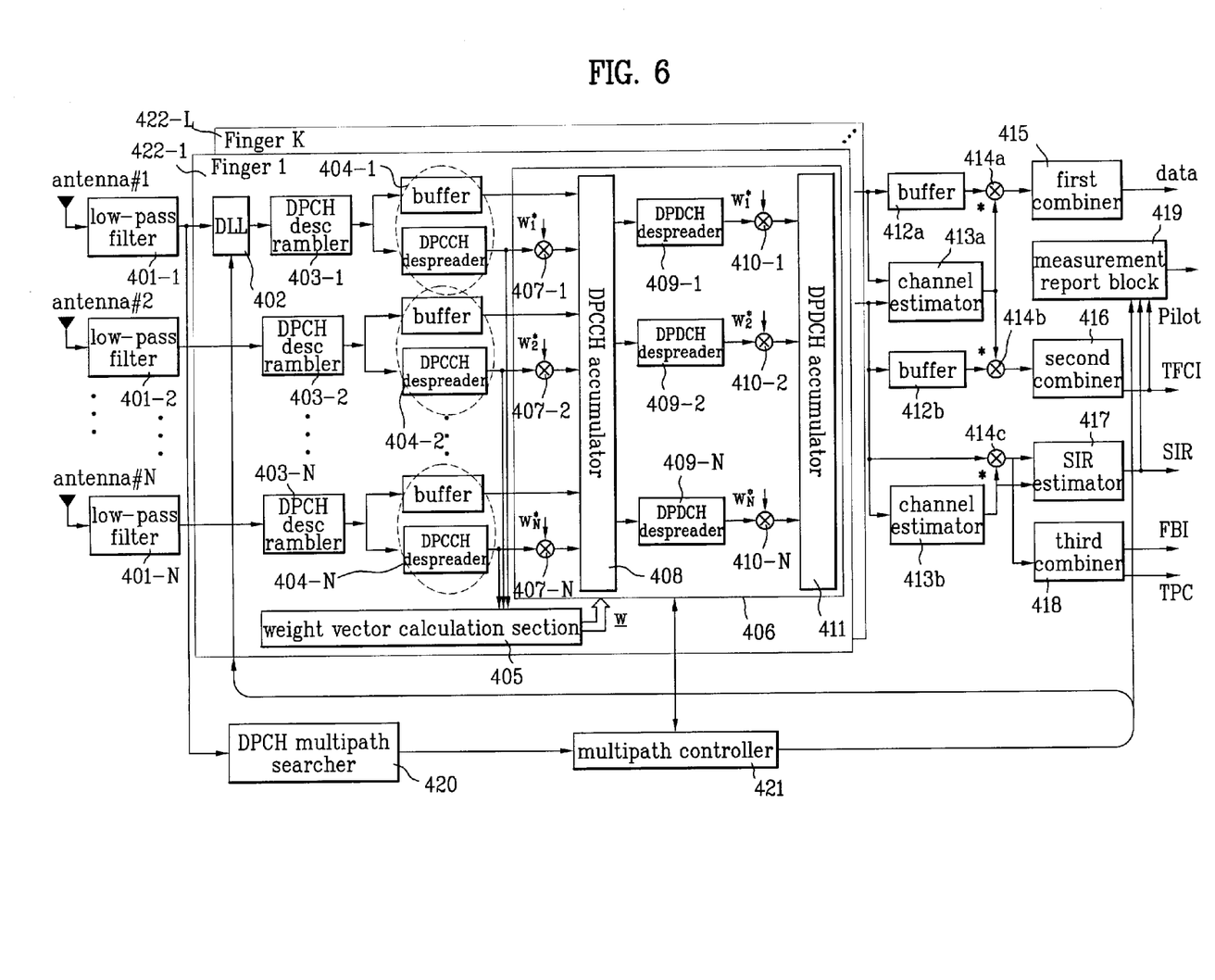
FIG. 6 is a diagram of a signal process system according to a third embodiment of the present invention.

FIG. 6 shows signal processing system according to a third embodiment of the present invention. In this embodiment, in the case of the beamforming according to the present invention, an autocorrelation matrix where only the desired signal component exists is obtained using only the despread DPCCH signal vector $\underline{y}$. Then, the weight vectors are calculated using a matrix expression as the following equation 4.

$$\underline{R}_{yy}w = \lambda w \qquad (4)$$

As described above, based on the assumption that the SF is fixed to a high value of 256 in case of the DPCCH, and thus it causes no problem to obtain the weight vectors and perform the beamforming without estimating the interference signal component, use of only the signal vectors composed of the desired signals is possible without obtaining the signal before the despreading of the DPCCH or the interference component.

The signal processing method for the basic spatial and temporal processes as shown in FIG. 6 does not use the signal before the despreading of the DPCCH, and is identical to the method illustrated in FIG. 5 except for the signal input into the weight vector calculation section 405. Thus, the construction of FIG. 5 can be used as it is.

Figure 7:
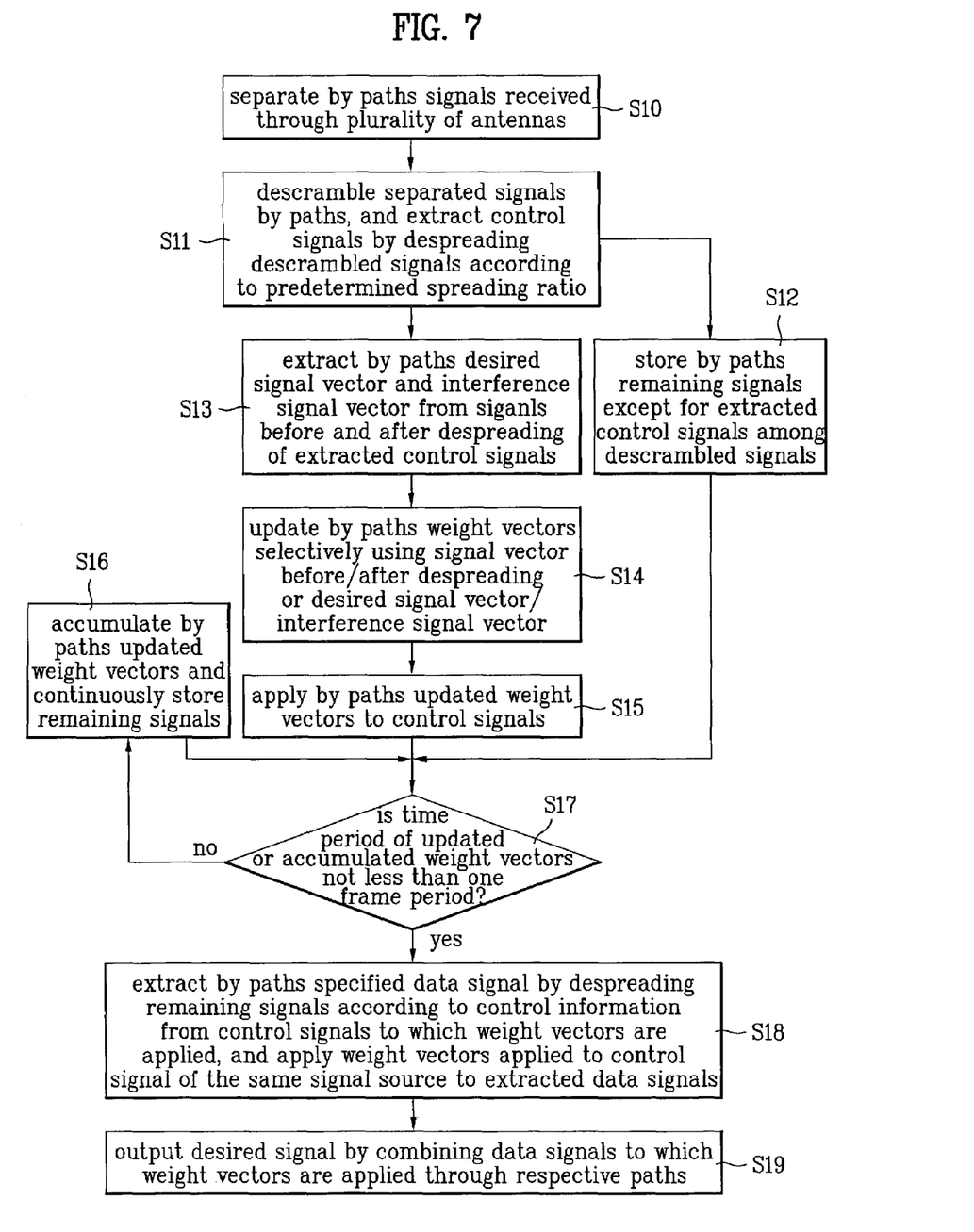
FIG. 7 is a flowchart illustrating a beamforming procedure of an adaptive array antenna system according to an embodiment of the present invention.

FIG. 7 is a flowchart showing steps included in a beamforming process of the adaptive array antenna system according to the embodiments of the present invention.

Referring to FIG. 7, signals received through a plurality of antenna are separated into multiple paths by the DPCH multipath searcher 320 or 420, and then allocated to the respective fingers (step S10).

The respective finger detects a signal for a specified user by descrambling the separated signal, and extracts a control signal by despreading the detected signal according to a predetermined (here, in order to extract the control signal with the spreading ratio of which is set to 256) spreading factor (step S11).

The respective finger also stores in the buffer the remaining signals except for the extracted control signal among the descrambled signals (step S12). At this time, the buffer continuously stores the signals until the weight vectors for one frame period are obtained from the extracted control signal.

In each respective path corresponding to a respective finger, a desired signal vector and an interference signal vector are extracted by despreading the extracted control signal (step S13). The interference signal vector is extracted by subtracting the signal before the despreading of the control signal from the despread signal of the control channel (step S13). The control channel has a fixed spreading factor (for example, 256) and a channelization code (or despreading code) predetermined between transmitting and receiving parts.

The weight vectors are updated by paths, in the unit of a symbol, slot, or frame according to the first embodiment that uses the signal after the despreading of the control channel and the signal before the despreading of the control signal, the second embodiment that uses the desired signal and the interference signal, and the third embodiment that uses only the signal after the despreading of the control channel (step S14).

The updated weight vector is applied to the control channel(step S15) in the corresponding unit.

It is judged if the period of the updated weight vector is the period of one frame (step S17), and if not, the updated weight vector is accumulated by paths, and the stored remaining signals are continuously stored (step S16). Then, it is judged if the period of the accumulated weight vector is the period of one frame (step S17), and if not, the storage of the accumulated weight vector and the stored remaining signals is maintained (step S16).

However, if it is judged that the period of the updated or accumulated weight vector is the period of one frame, the updated or accumulated weight vector is applied to a data channel (step S18). In other words, a specified data signal is extracted by despreading by paths the remaining signals stored in the buffer using the control information (i.e., SF, channelization code, etc.) from the control channel to which the weight vector is applied for the period of one frame. The weight vector applied to the control signal of the same signal source is applied to the extracted data signal (step S18).

Then, a desired signal is outputted through combination of the data signals to which the weight vectors are applied in the respective paths (step S19).

Meanwhile, according to the present invention, weight vectors obtained for each weight value updating period using the DPCCH without using the buffer may be sequentially applied to the remaining signals, and then the data channel may be extracted by sequentially despreading the signals to which the weight vectors are applied.

As described above, according to the present invention, the spatial and temporal processes are performed by adequately using the characteristic of the WCDMA system in a manner that not only the temporal process using the characteristic of the code but also the spatial process using the antenna array is performed, and thus the gain of the performance obtained from the antenna array as well as the gain of the performance of the existing WCDMA system can be obtained, thereby improving the communication quality.

It will be apparent to those skilled in the art than various modifications and variations can be made in the present invention. Thus, it is intended that the present invention covers the modifications and variations of this invention provided they come within the scope of the appended claims and their equivalents.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for processing signals in a CDMA radio communication system having a plurality of antennas, comprising:
    extracting control signals by despreading signals transmitted to a specified user through the plurality of antennas using a predetermined spreading factor;
    estimating weight values of respective ones of the plurality of antennas using at least one signal separated from the extracted control signals;
    extracting data signals by despreading remaining signals, except for the control signals, among the signals transmitted to the specified user using control information provided from control channels;
    multiplying the extracted data signals by the weight values of the respective antennas; and
    combining and outputting the data signals multiplied by the weight values, wherein estimating the weight values includes estimating the weight values based on a ratio of a signal vector before despreading and the signal vector after despreading.

2. The method of claim 1, wherein the data signal extracting step comprises:
    temporarily storing the remaining signals except for the control signals among the signals transmitted to the specified user;
    judging if a time period of the estimated weight values is a period of one frame; and
    if it is judged that the time period is the period of one frame, extracting the data signals by applying the estimated weight values to the stored remaining signals.

3. The method of claim 2, wherein the estimated weight values are updated for each weight updating period, and accumulated for the period of one frame.

4. The method of claim 1, further comprising:
    applying the estimated weight values to the control channels;
    obtaining the control information from the control channels to which the weight values are applied.

5. A method for processing signals in a CDMA radio communication system having a plurality of antennas, comprising:
    extracting control signals by despreading signals transmitted to a specified user through the plurality of antennas using a predetermined spreading factor;
    estimating weight values of respective ones of the plurality of antennas using at least one signal separated from the extracted control signals;
    extracting data signals by despreading remaining signals, except for the control signals, among the signals transmitted to the specified user using control information provided from control channels;
    multiplying the extracted data signals by the weight values of the respective antennas; and
    combining and outputting the data signals multiplied by the weight values, wherein the weight value estimating step comprises:
    calculating an interference signal vector by subtracting the signal after despreading of the control signals from the signal before despreading of the control signals; and
    estimating the weight value using a ratio of a desired signal extracted from the signal after despreading to the interference signal vector.

6. A method for processing signals in a CDMA radio communication system having a plurality of antennas comprising:
    separating signals of a same signal source by despreading signals received through control channels having a constant spreading ratio among signals received through the plurality of antennas;
    estimating weight values of respective ones of the plurality of antennas for the signals of the same signal source;
    despreading the signals of the data channels of the same signal source using control information received through the control channels;
    multiplying the despread signals of the data channels by the weight values of the respective antennas, respectively; and
    combining and outputting the signals multiplied by the weight values, wherein estimating the weight values includes estimating the weight values based on a ratio of a signal vector before despreading and the signal vector after despreading.

7. A method for processing signals in a CDMA radio communication system having a plurality of antennas, comprising:
    extracting control signals by despreading signals transmitted to a specified user through the plurality of antennas using a predetermined spreading factor;
    estimating weight values of respective ones of the plurality of antennas using at least one signal separated from the extracted control signals in the unit of a symbol or slot;

applying the estimated weight values to the control channels in the corresponding unit and accumulating the weight values for the period of one frame;

obtaining control information from the control channel to which the estimated weight values are applied for the period of one frame;

extracting data signals by despreading remaining signals except for the control signals among the signals transmitted to the specified user using the control information;

multiplying the extracted data signals by the accumulated weight values of the respective antennas; and combining and outputting the data signals multiplied by the weight values, wherein estimating the weight values includes estimating the weight values based on a ratio of a signal vector before despreading and the signal vector after despreading.

8. A signal processing apparatus in a CDMA radio communication system having a plurality of antennas, the apparatus comprising:

a first signal extractor which extracts control signals by despreading signals transmitted to a specified user through the plurality of antennas using a predetermined spreading factor;

a weight value estimator which estimates weight values of respective ones of the plurality of antennas using at least one signal separated from the extracted control signals;

a second signal extractor which extracts data signals by despreading remaining signals, except for the control signals, among the signals transmitted to the specified user using the control information provided from control channels;

a weight value applying unit which multiplies the extracted data signals by the weight values of the respective antennas; and a combiner which combines and outputs the data signals multiplied by the weight values, wherein the weight value estimator estimates the weight values based on a ratio of a signal vector before despreading and the signal vector after despreading.

9. The signal processing apparatus of claim 8, wherein the first signal extractor applies the estimated weight values to the control channels and provides the second signal extractor with the control information from the control channels to which the weight values are applied.

10. A signal processing apparatus, in a CDMA radio communication system having a plurality of antennas, the apparatus comprising:

a first signal extractor which extracts control signals by despreading signals transmitted to a specified user through the plurality of antennas using a predetermined spreading factor;

a weight value estimator which estimates weight values of respective ones of the plurality of antennas using at least one signal separated from the extracted control signals;

a second signal extractor which extracts data signals by despreading remaining signals, except for the control signals, among the signals transmitted to the specified user using the control information provided from control channels;

a weight value applying unit which multiplies the extracted data signals by the weight values of the respective antennas; and a combiner which combines and outputs the data signals multiplied by the weight values, said apparatus further comprising:

a buffer for temporarily storing the remaining signals except for the control signals among the signals transmitted to the specified user; and a discriminator for judging if a time period of the estimated weight values is a period of one frame, wherein if it is judged that the time period is the period of one frame, the second signal extractor extracts the data signals by applying the estimated weight values to the stored remaining signals.

11. The signal processing apparatus of claim 10, wherein the estimated weight values are updated for each weight updating period, and accumulated for the period of one frame.

12. A signal processing apparatus, in a CDMA radio communication system having a plurality of antennas, the apparatus comprising:

a first signal extractor which extracts control signals by despreading signals transmitted to a specified user through the plurality of antennas using a predetermined spreading factor;

a weight value estimator which estimates weight values of respective ones of the plurality of antennas using at least one signal separated from the extracted control signals;

a second signal extractor which extracts data signals by despreading remaining signals, except for the control signals, among the signals transmitted to the specified user using the control information provided from control channels;

a weight value applying unit which multiplies the extracted data signals by the weight values of the respective antennas; and a combiner which combines and outputs the data signals multiplied by the weight values, wherein the weight value estimator calculates an interference signal vector by subtracting the signal after despreading of the control signals from the signal before despreading of the control signals, and estimates the weight value using the ratio of a desired signal extracted from the signal after despreading to the interference signal vector.

* * * * *